(12) United States Patent
Serizawa (10) Patent No.: US 8,027,075 B2
(45) Date of Patent: Sep. 27, 2011

(54) OPTICAL SCANNING UNIT AND IMAGE FORMING APPARATUS INCORPORATING SAME

(75) Inventor: Keiichi Serizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 719 days.

(21) Appl. No.: 12/073,309

(22) Filed: Mar. 4, 2008

(65) Prior Publication Data

US 2008/0218828 A1    Sep. 11, 2008

(30) Foreign Application Priority Data

Mar. 6, 2007 (JP) ................. 2007-055645

(51) Int. Cl.
*G02B 26/08* (2006.01)
(52) U.S. Cl. ............ 359/206.1; 347/259; 347/263; 359/205.1
(58) Field of Classification Search .... 359/206.1–207.6, 359/216.1–219.2, 662, 196.1–226.2; 347/242–245, 347/257–261
See application file for complete search history.

(56) References Cited

U.S. PATENT DOCUMENTS

| | | | | |
|---|---|---|---|---|
| 4,796,963 A | * | 1/1989 | Yoshimura | 359/218.1 |
| 5,111,219 A | * | 5/1992 | Makino | 347/259 |
| 7,256,813 B2 | | 8/2007 | Serizawa et al. | |
| 2001/0001251 A1 | * | 5/2001 | Tachibe et al. | 359/819 |
| 2005/0243163 A1 | * | 11/2005 | Ozasa et al. | 347/243 |
| 2006/0209375 A1 | | 9/2006 | Serizawa | |
| 2007/0098460 A1 | | 5/2007 | Serizawa | |

FOREIGN PATENT DOCUMENTS

| | | |
|---|---|---|
| JP | 2001-162864 | 6/2001 |
| JP | 2003-278916 | 10/2003 |
| JP | 2004-354848 | 12/2004 |
| JP | 2005-234506 | 9/2005 |
| JP | 2005-242041 | 9/2005 |

\* cited by examiner

*Primary Examiner* — James Phan
(74) *Attorney, Agent, or Firm* — Harness, Dickey & Pierce, PLC (57) ABSTRACT

An optical scanning unit used for scanning a photoconductor includes a light source, a rotatable deflector, a driver, a scan lens, an optical element, a first casing, a second casing, a first cover, and a second cover. The rotatable deflector deflects a light beam generated by the light source to scan a surface of the photoconductor. The driver rotates the rotatable deflector. The scan lens converts the light beam deflected by the rotatable deflector with equiangular motion speed to a light beam having constant speed motion. The optical element is disposed along an optical path from the scan lens to the photoconductor surface. The first casing houses the light source, the rotatable deflector, and the scan lens. The second casing houses the first casing and the optical element. The first cover covers at least the first casing. The second cover covers the optical element housed in the second casing.

20 Claims, 7 Drawing Sheets

OPTICAL SCANNING UNIT AND IMAGE FORMING APPARATUS INCORPORATING SAME

CROSS-REFERENCE TO RELATED APPLICATIONS

This application claims priority from Japanese Patent Application No. 2007-055645 filed on Mar. 6, 2007 in the Japan Patent Office, the entire contents of which are hereby incorporated by reference herein.

BACKGROUND OF THE INVENTION

1. Field of the Invention

The present disclosure generally relates to an optical scanning unit and an image forming apparatus incorporating the optical scanning unit.

2. Description of the Background Art

Generally, an image forming apparatus, such as copier, printer, or facsimile, has an optical scanning unit that scans a latent image carrier with a light beam based on image information to form a latent image on the latent image carrier. The latent image is then developed as a toner image. Such optical scanning unit (or optical writing unit) generally includes a light source, a rotatable deflector such as polygon mirror, and a driver such as polygon motor, and as a whole may be termed a polygon scanner.

Further, the optical scanning unit includes a scan lens such as an f-theta lens for converting a writing beam having an equiangular speed when deflected by the polygon mirror to a writing beam having a constant speed to be used for scanning the latent image carrier. Further, the optical scanning unit includes a reflecting mirror disposed along an optical path from the f-theta lens to the latent image carrier.

The writing beam emitted from the light source is deflected by the rotating polygon mirror at an equiangular speed, enters the f-theta lens, is converted to a writing beam having a constant speed used for scanning the latent image carrier, and is scanned in a main scanning direction. The writing beam converted by the f-theta lens may be reflected by mirrors so as to irradiate the latent image carrier.

Such optical scanning units may be encased and attached in a single casing that is hermetically-sealed with a cover so that dust or other foreign particles may not adhere to optical components such as the reflecting mirror housed in the casing.

Theoretically, an adequate latent image can be formed on the latent image carrier using only a light source, a polygon scanner, and an f-theta lens. However, in practice it is difficult to directly pass a writing beam through the f-theta lens to scan the surface of a latent image carrier in an actual image forming apparatus due to a layout configuration of the image forming apparatus. Therefore, in general, one or more reflecting mirrors are disposed along an optical path from the f-theta lens to the latent image carrier, in which the writing beam passed through the f-theta lens is reflected by the reflecting mirror and then directed onto the latent image carrier surface.

Generally, the relative positions of the light source, the polygon scanner, and the f-theta lens, which are the minimum required elements for forming an adequate latent image on a latent image carrier, is similar among virtually all optical scanning units. At the same time, however, attachment positions and attachment angles of the reflecting mirrors guiding a writing beam passed through an f-theta lens to a latent image carrier vary among optical scanning units depending on the layout configuration of image forming apparatuses.

In one related art configuration, an optical scanning unit employs a first casing and a second casing, with the first casing housing a light source, a polygon scanner, and an f-theta lens, which are the minimum required elements for forming a latent image on a latent image carrier, and the second casing housing optical devices or elements such as one or more reflecting mirrors or the like. Such first and second casings can be attached together and combined in a single optical scanning unit.

With such a configuration, the first casing, having a common configuration among optical scanning units, can be attached to the second casing having different attachment angles and attachment positions for optical elements such as the reflecting mirrors due to the layout configuration of a particular image forming apparatus.

Such a configuration having the first casing for housing the light source, the polygon scanner, and the f-theta lens, and the second casing for housing optical elements such as reflecting mirror, has following preferable features.

Specifically, parts management of light sources, polygon scanners, and f-theta lenses among a plurality of optical scanning units can be commonly conducted. Further, attachment precision testing of light sources, polygon scanners, and f-theta lenses to casings can be commonly conducted among a plurality of optical scanning units. Accordingly, optical scanning units can be manufactured with reduced cost.

In such optical scanning units, the second casing and the first casing are covered by one cover member and hermetically sealed after the first casing is attached to the second casing. A maintenance operation of polygon scanner (e.g., replacement of polygon scanner) attached in the first casing can be conducted by removing such cover member.

However, when such cover member is removed for maintenance operation of polygon scanner, optical elements such as the reflecting mirror attached to the second casing are also exposed to outside, and thereby dust may adhere to the optical elements. Such adhesion of dust or foreign particles to the optical elements may cause undesirable images, such as images having white streaks.

SUMMARY

The present disclosure relates to an optical scanning unit used for scanning a photoconductor including a light source, a rotatable deflector, a driver, a scan lens, an optical element, a first casing, a second casing, a first cover, and a second cover. The light source generates a light beam. The rotatable deflector deflects the light beam generated by the light source to scan a surface of the photoconductor in a main scanning direction with the light beam. The driver rotates the rotatable deflector. The scan lens converts the light beam deflected by the rotatable deflector with equiangular motion speed to a light beam having constant speed motion to scan the photoconductor. The optical element is disposed along an optical path from the scan lens to the photoconductor surface to guide the light beam passed through the scan lens. The first casing houses the light source, the rotatable deflector, and the scan lens. The second casing houses the first casing and the optical element disposed along an optical path from the scan lens to the photoconductor. The first cover covers at least the first casing. The second cover covers the optical element housed in the second casing.

The present disclosure also relates to a container including a first casing, a second casing, a first cover, and a second cover. The first casing houses a first object, detachably mounted in the first casing. The second casing houses the first casing and a second object. The first cover covers the first casing. The second cover covers the second casing, and the second cover has an opining portion covered by the first cover. The first object is removable from the first casing through the opening portion of the second cover when the first cover is removed from the opening portion while the second casing is covered by the second cover.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded view s shown in the drawings, specific terminology is employed for the sake of clarity, the present disclosure is not limited to the specific terminology so selected and it is to be understood that each specific element includes all technical equivalents that operate in a similar manner.

Referring now to the drawings, an image forming apparatus according to an exemplary embodiment is described with reference to accompanying drawings. The image forming apparatus may be a printer having a tandem arrangement and using intermediate transfer method but not limited thereto.

Figure 1:
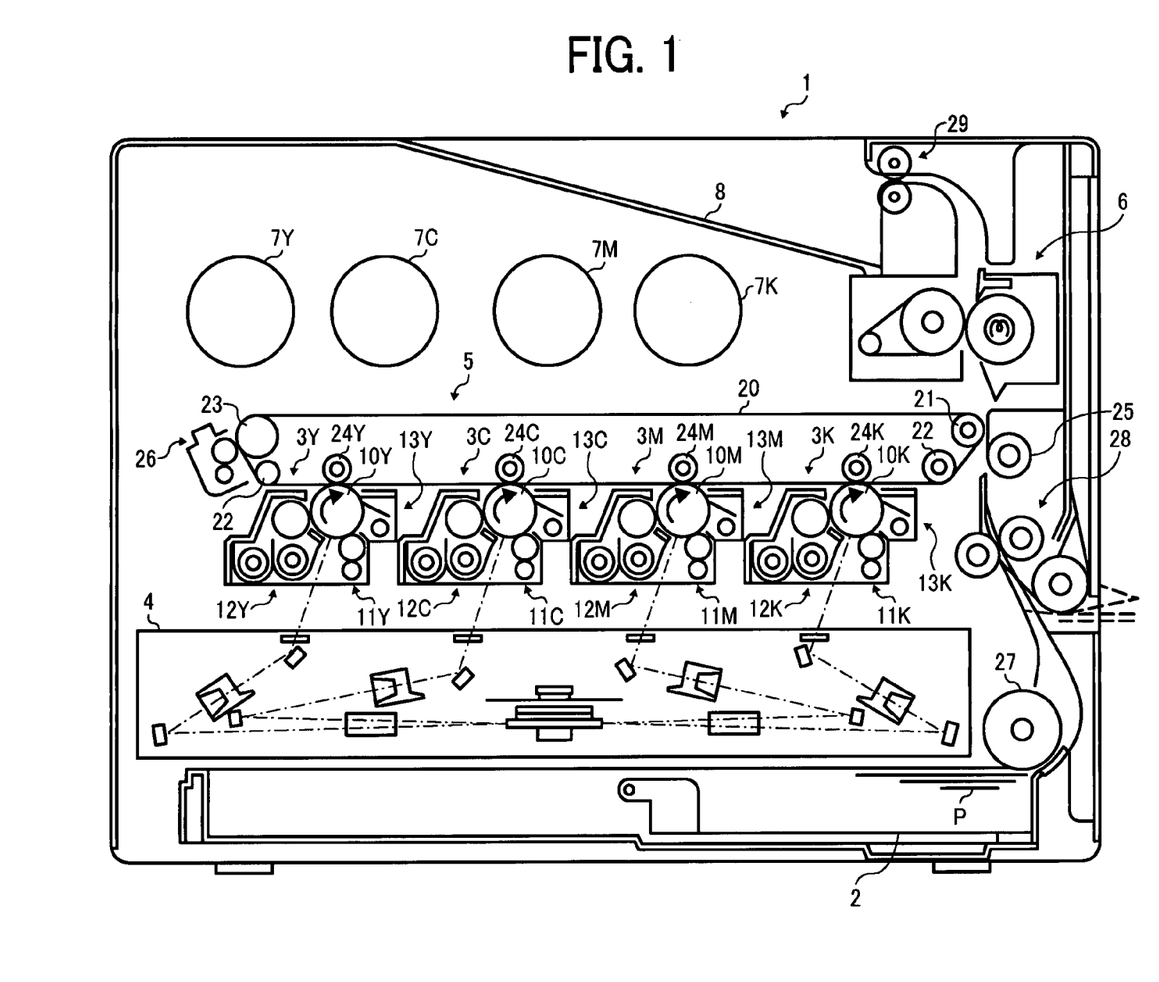
FIG. 1 illustrates a schematic configuration of an image forming apparatus according to an exemplary embodiment.

FIG. 1 illustrates a schematic configuration of an image forming apparatus 1 according to an exemplary embodiment. The image forming apparatus 1 includes a sheet cassette 2 detachably mounted in the image forming apparatus 1, and image forming engines 3Y, 3C, 3M, and 3K for forming toner images (or visible images) of yellow (Y), cyan (C), magenta (M), and black (K), for example. Hereinafter, suffixes Y, C, M, and K indicate yellow, cyan, magenta, and black, respectively.

Figure 2:
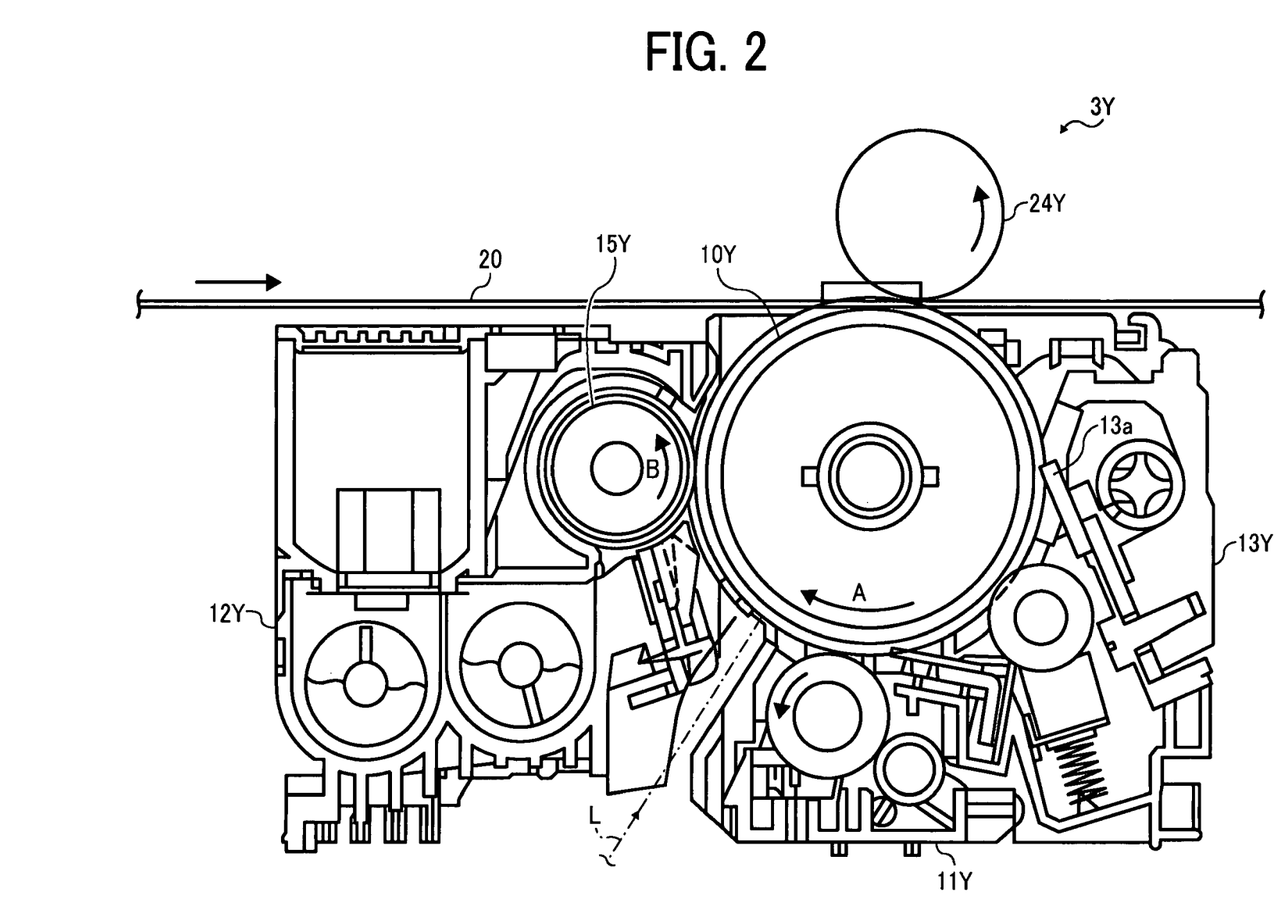
FIG. 2 illustrates a schematic configuration of an image forming engine used in the image forming apparatus of FIG. 1.

FIG. 2 illustrates a schematic configuration of the image forming engine 3Y for yellow, which is similarly employed for other image forming engines 3C, 3M, and 3K. As illustrated in FIGS. 1 and 2, the image forming engines 3Y, 3C, 3M, and 3K respectively include photoconductors 10Y, 10C, 10M, and 10K, wherein the photoconductor 10, having a drum shape and rotatable in a direction shown by an arrow A, is used as latent image carrier. Each of the photoconductors 10Y, 10C, 10M, and 10K includes a cylindrical core made of aluminum and having a given diameter (e.g., 40 mm) and an OPC (organic photoconductor) layer formed on the cylindrical core, for example. Each of the image forming engines 3Y, 3C, 3M, and 3K, respectively include chargers 11Y, 11C, 11M, 11K, developing units 12Y, 12C, 12M, 12K, and cleaning units 13Y, 13C, 13M, 13K around the photoconductors 10Y, 10C, 10M, 10K. The charger 11 charges the photoconductor 10. The developing unit 12 develops a latent image formed on the photoconductor 10. The cleaning unit 13 cleans toners remaining on the photoconductor 10.

The image forming apparatus 1 further includes an optical scanning unit 4 under the image forming engines 3Y, 3C, 3M, and 3K, wherein the optical scanning unit 4 irradiates a writing beam to the photoconductors 10Y, 10C, 10M, and 10K. The image forming apparatus 1 further includes an intermediate transfer unit 5 over the image forming engines 3Y, 3C, 3M, and 3K. The intermediate transfer unit 5 includes an intermediate transfer belt 20, which is transferred with toner images from the image forming engines 3Y, 3C, 3M, and 3K. The image forming apparatus 1 further includes a fusing unit 6, in which a toner image transferred on a transfer sheet P from the intermediate transfer belt 20 is fixed on the transfer sheet P used as recording medium. The image forming apparatus 1 further includes toner bottles 7Y, 7C, 7M, and 7K over the intermediate transfer unit 5, wherein the toner bottles 7Y, 7C, 7M, and 7K stores toners of yellow, cyan, magenta, and black, respectively. The toner bottles 7Y, 7C, 7M, and 7K are detachably mountable in the image forming apparatus 1, and can be replaced by opening a sheet ejection tray 8 disposed at the top of the image forming apparatus 1.

The optical scanning unit 4 includes a light source such as laser diode to emit a writing beam L (or laser beam), a polygon mirror to deflect the writing beam, which is to be scanningly irradiated onto the photoconductors 10Y, 10C, 10M, and 10K. The optical scanning unit 4 will be described later in detail.

The intermediate transfer unit 5 includes the intermediate transfer belt 20, which is extended by a drive roller 21, a tension roller 22, and a driven roller 23, and driven in the counter-clockwise direction in FIGS. 1 and 2 at a given timing. The intermediate transfer unit 5 further includes primary transfer rollers 24Y, 24C, 24M, and 24K, used to transfer toner images formed on the photoconductors 10Y, 10C, 10M, and 10K to the intermediate transfer belt 20. The intermediate transfer unit 5 further includes a secondary transfer roller 25 and a belt cleaning unit 26, wherein the secondary transfer roller 25 is used to transfer toner images formed on the intermediate transfer belt 20 to the transfer sheet P, and the belt cleaning unit 26 cleans toners remaining on the intermediate transfer belt 20 after transferring the toner images to the transfer sheet P.

A description is now given to an image forming process in the image forming apparatus 1. First, the chargers 11Y, 11C, 11M, and 11K uniformly charge the photoconductors 10Y, 10C, 10M, and 10K in the image forming engines 3Y, 3C, 3M, and 3K. Then, the optical scanning unit 4 irradiates the laser beam L to surfaces of the photoconductors 10Y, 10C, 10M, and 10K to form latent images based on image information. The latent images on the photoconductors 10Y, 10C, 10M, and 10K are developed by toners of each color carried on developing rollers 15Y, 15C, 15M, and 15K of the developing units 12Y, 12C, 12M, and 12K as toner image or visible image. The toner images on the photoconductors 10Y, 10C, 10M, and 10K are sequentially transferred and superimposed on the intermediate transfer belt 20, rotating in the counter-clockwise direction, with an effect of the primary transfer rollers 24Y, 24C, 24M, and 24K. Each of the toner images are formed on the photoconductors 10Y, 10C, 10M, and 10K by shifting a toner image forming timing with respect to a moving direction of the intermediate transfer belt 20 (i.e., from upstream to downstream of the moving direction of the intermediate transfer belt 20) so that each of the toner images can be transferred and superimposed on a same position on the intermediate transfer belt 20. After completing such primary transfer, the surface of photoconductors 10Y, 10C, 10M, and 10K are cleaned by a cleaning blade 13a of the cleaning units 13Y, 13C, 13M, and 13K, and prepared for a next image forming operation. Toners stored in the toner bottles 7Y, 7C, 7M, and 7K are supplied to the developing units 12Y, 12C, 12M, and 12K in the image forming engines 3Y, 3C, 3M, and 3K via a transport path (not shown) with a given amount, as required.

During such image forming process, the transfer sheet P in the sheet cassette 2 is transported by a feed roller 27, disposed at the sheet cassette 2, to a registration roller 28 at a given timing, and then transported to a secondary transfer nip. At the secondary transfer nip, toner images formed on the intermediate transfer belt 20 are transferred to the transfer sheet P. The transfer sheet P transferred with toner image are then fed to the fusing unit 6 to fix toner image on the transfer sheet P, and then ejected to the sheet ejection tray 8 by an ejection roller 29. As similar to the photoconductor 10, toners remaining on the intermediate transfer belt 20 are cleaned by the belt cleaning unit 26, which can contact the intermediate transfer belt 20.

Figure 3:
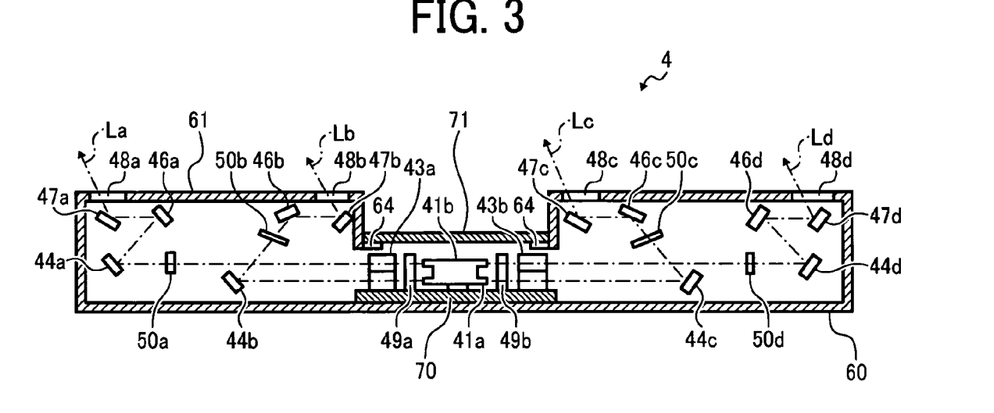
FIG. 3 illustrates a cross-sectional schematic view of an optical scanning unit according to an exemplary embodiment.
Figure 4:
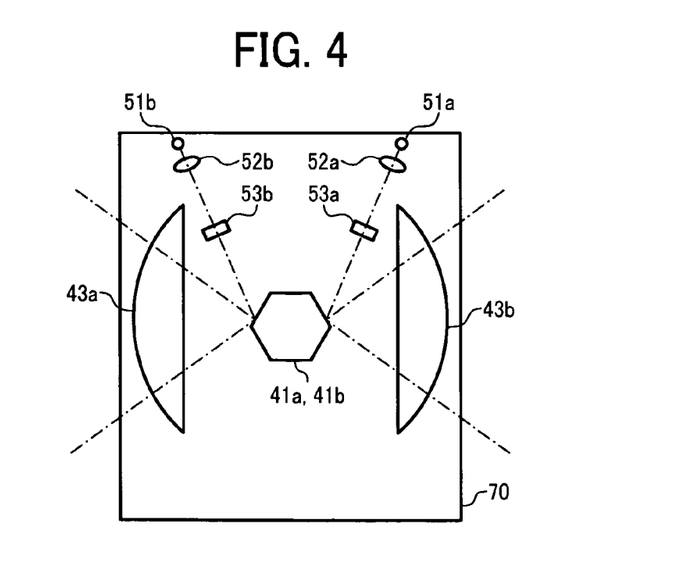
FIG. 4 illustrates a plan view of a first casing of the optical scanning unit of FIG. 3.
Figure 5:
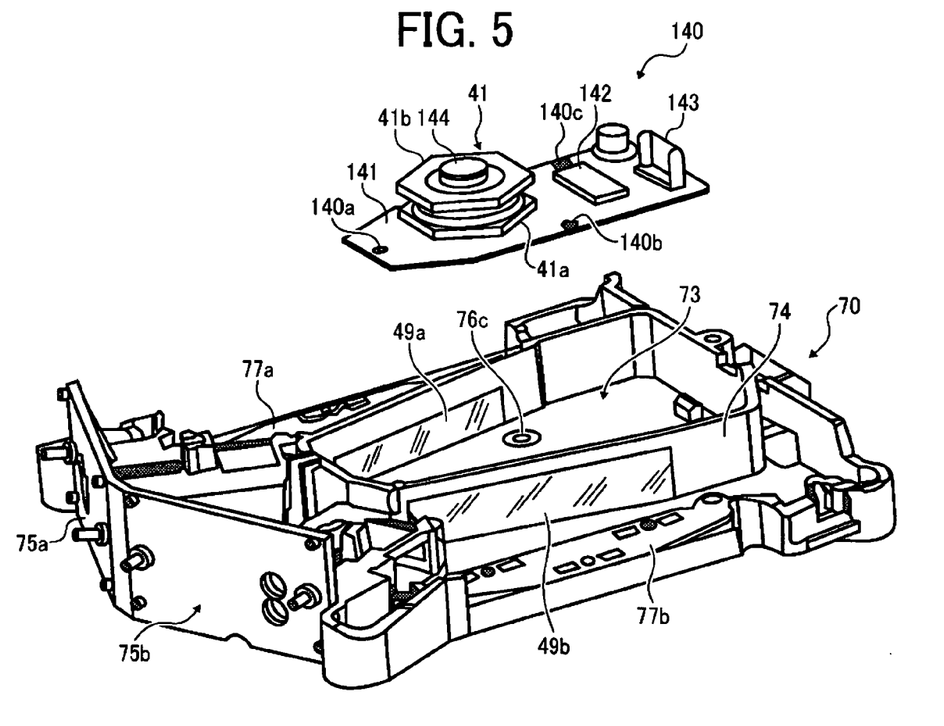
FIG. 5 illustrates a perspective view of the first casing of FIG. 4.

A description is now given to a schematic configuration of the optical scanning unit 4 with reference to FIGS. 3, 4, and 5. FIG. 3 illustrates a cross-sectional view of the optical scanning unit 4. FIG. 4 illustrates a plan view of a first casing 70 of the optical scanning unit 4. FIG. 5 illustrates a perspective view of the first casing 70.

In an exemplary embodiment, the optical scanning unit 4 includes the first casing 70 and a second casing 60. The first casing 70 houses optical elements, which are disposed along an optical path starting from laser diodes 51a and 51b (used as light source) to f-theta lenses 43a and 43b. The second casing 60 houses optical elements, which are disposed along an optical path starting from the f-theta lenses 43a and 43b to the photoconductor 10.

As illustrated in FIG. 4, the first casing 70 houses the laser diodes 51a and 51b as light source, collimate lenses 52a and 52b, cylindrical lenses 53a and 53b, a polygon scanner 140 as deflector, f-theta lenses 43a and 43b as scan lens for converting a laser beam having equiangular motion to constant speed motion. The laser diodes 51a and 51b are respectively attached to light source holders 75a and 75b (see FIG. 5), provided at an end portion of the first casing 70. The polygon scanner 140 includes polygon mirrors 41a and 41b (as rotatable deflector), a polygon motor 144 (as driver), and a circuit board 141 having an electronic device 142, for example, as illustrated in FIG. 5. The polygon mirrors 41a and 41b have a regular polygon shape, and the electronic device 142 controls a driving of the polygon motor 144. The circuit board 141 is attached with a connector 143 connected to a harness (not shown), through which a power unit of the image forming apparatus 1 can supply power to the electronic device 142 and the polygon motor 144. The polygon scanner 140 is fixed to the first casing 70 by fixing the polygon scanner 140 in a polygon scanner compartment 73 surrounded by a side wall 74 with screws. For example, three screws (not shown) inserted in holes 140a, 140b, and 140c provided for the circuit board 141 of the polygon scanner 140, and such three screws are screwed to screw holes 76a (not shown), 76b (not shown), and 76c provided for the first casing 70 to fix the polygon scanner 140 in the first casing 70.

The f-theta lenses 43a and 43b are attached to scan lens holders 77a and 77b of the first casing 70. Further, the collimate lenses 52a and 52b, and the cylindrical lenses 53a and 53b are respectively attached along an optical path starting from the laser diodes 51a and 51b to the polygon mirror 41a and 41b in the first casing 70 as illustrated in FIG. 4. Further, soundproof glasses 49a and 19b are provided on the side wall 74 of the first casing 70 as illustrated in FIG. 5.

Figure 6:
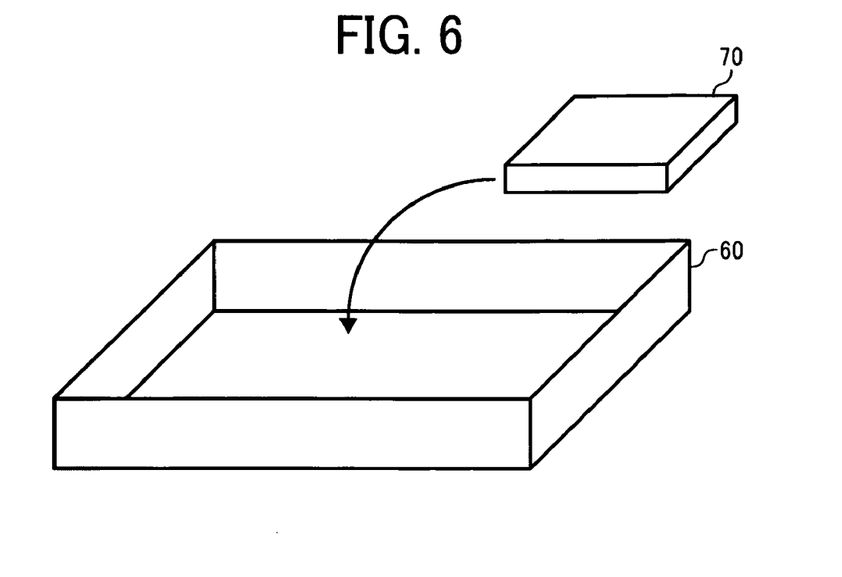
FIG. 6 illustrates a schematic configuration of a first casing and a second casing, wherein the first casing is attached to the second casing.

Such configured first casing 70 can be attached to the second casing 60 as illustrated in FIG. 6. As illustrated in FIG. 3, in addition to the first casing 70, the second casing 60 is attached with mirrors 44a, 44b, 44c, 44d, 46a, 46b, 46c, 46d, 47a, 47b, 47c, and 47d used for guiding a laser beam to the photoconductors 10Y, 10C, 10M, and 10K, long lenses 50a, 50b, 50c, and 50d for correcting optical face tangle error of the polygon mirror 41a and 41b, and a beam synchronization detector (not shown), for example. As illustrated in FIG. 3, the photoconductors 10Y, 10C, 10M, and 10K is irradiated with a writing beam coming along optical paths La, Lb, Lc, and Ld, respectively.

Figure 7:
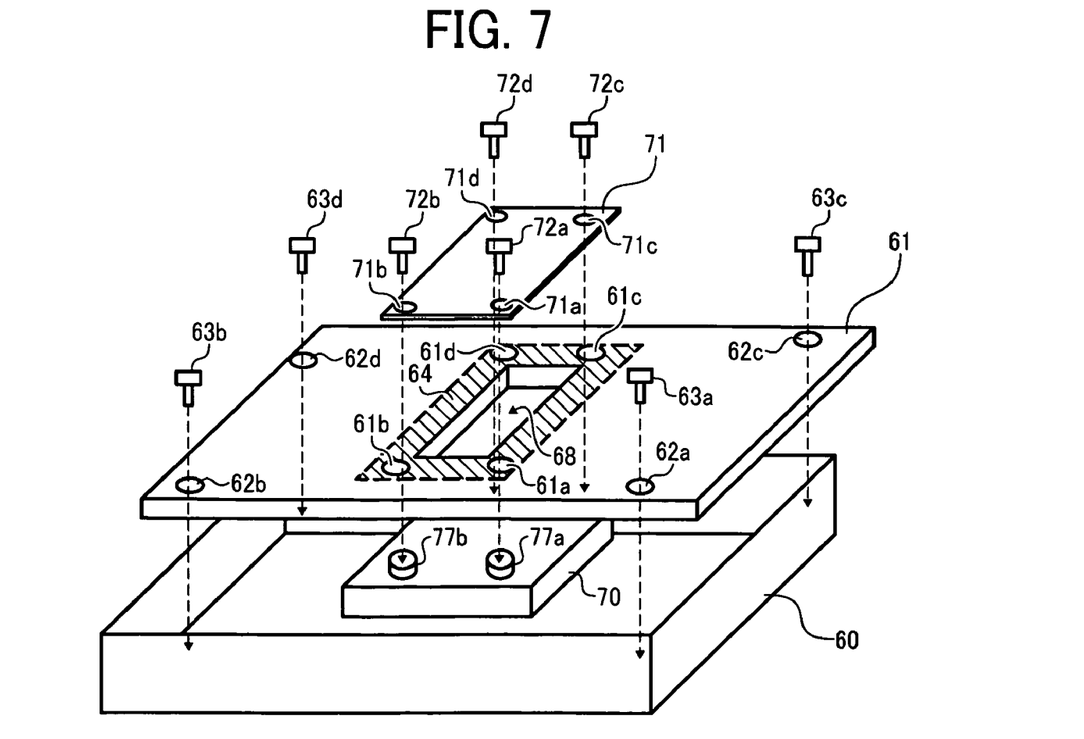
FIG. 7 illustrates a schematic attachment configuration of first and second covers to first and second casings of the optical scanning unit of FIG. 3.

As illustrated in FIG. 7, the first casing 70 and the second casing 60 are covered by a first cover 71 and a second cover 61. The first cover 71, made of metal, is attached and fixed to the first casing 70, and covers at least the polygon scanner 140. The second cover 61 is attached and fixed to the second casing 60, and covers at least the mirrors 44a, 44b, 44c, 44d, 46a, 46b, 46c, 46d, 47a, 47b, 47c, and 47d, and the long lenses 50a, 50b, 50c, and 50d.

Specifically, as illustrated in FIG. 7, screws 63a, 63b, 63c, and 63d are inserted in through holes 62a, 62b, 62c, 62d provided for the second cover 61, and then screwed to screw holes (not shown) provided for the second casing 60 to fix the second cover 61 to the second casing 60.

The second cover 61 has an opening portion 68 having rectangular shape in its center portion, through which the polygon scanner 140 can be seen when the first cover 71 is not attached to the second cover 61 covering the second casing 60.

Attachment holes 61a, 61b, 61c, 61d are provided around the opening portion 68 of the second cover 61. The first cover 71 is provided with through holes 71a, 71b, 71c, and 71d. Screws 72a to 72d are inserted to the through holes 71a to 71d and the attachment holes 61a to 61d of the second cover 61, respectively, and then screwed to screw holes 77a, 77b, 77c (not shown), and 77d (not shown) to fix the first casing 70 to the second cover 61.

Accordingly, when the first cover 71 is fixed to the second cover 61 and the first casing 70 by the screws 72a to 72d, optical elements or the like housed in the first casing 70, exposed to outside from the opening portion 68 of the second cover 61, can be covered by the first cover 71.

In such configuration, when to replace the polygon scanner 140, the screws 72a to 72d are unscrewed to unfix and remove the first cover 71 from the first casing 70. With such process, the polygon scanner 140 is exposed to outside through the opening portion 68 of the second cover 61. At this time, the mirrors 44a, 44b, 44c, 44d, 46a, 46b, 46c, 46d, 47a, 47b, 47c, and 47d, and the long lenses 50a, 50b, 50c, and 50d are covered by the second cover 61, by which they are not exposed to outside. Therefore, dust or foreign particles adhesion to mirrors or lenses housed in the second casing 60 can be suppressed.

Then, screws (not shown) are removed to unfix the polygon scanner 140 from the first casing 70, and remove the polygon scanner 140 from the opening portion 68 of the second cover 61. Then, new polygon scanner 140 is inserted and positioned in the polygon scanner compartment 73 through the opening portion 68 and screwed to the polygon scanner compartment 73, by which the new polygon scanner 140 can be fixed in the first casing 70. Then, the first cover 71 is fixed to the second cover 61 and the first casing 70 with the screws 72a to 72d.

Further, in an exemplary embodiment, the second cover 61 is provided with an overlapping area 64, shown by slanted lines in FIG. 7, at which the first cover 71 overlaps with the second cover 61. With such configuration, the first cover 71 can closely contacts the second cover 61 at the overlapping area 64 and is fixed to the second cover 61 and the first casing 70, and thereby an intrusion of dust or foreign particles from a space between the first cover 71 and the second cover 61 can be suppressed.

When the polygon motor 144 is driven, the polygon motor 144 and the electronic device 142 of the polygon scanner 140 generate heat. If the generated heat may accumulate in the optical scanning unit 4, the optical scanning unit 4 becomes higher temperature condition, which may result in undesirable thermal deformation of optical elements such as f-theta lens made of resin.

In an exemplary embodiment, the first cover 71 is made of a metal having higher heat conductivity. Accordingly, heat generated at the polygon scanner 140 can be conducted with a faster rate via the first cover 71, and then dissipated to outside of the optical scanning unit 4 via the first cover 71. Accordingly, an increase in temperature in the optical scanning unit 4 can be suppressed, and thermal deformation of optical elements such as f-theta lens can be suppressed.

Figure 8:
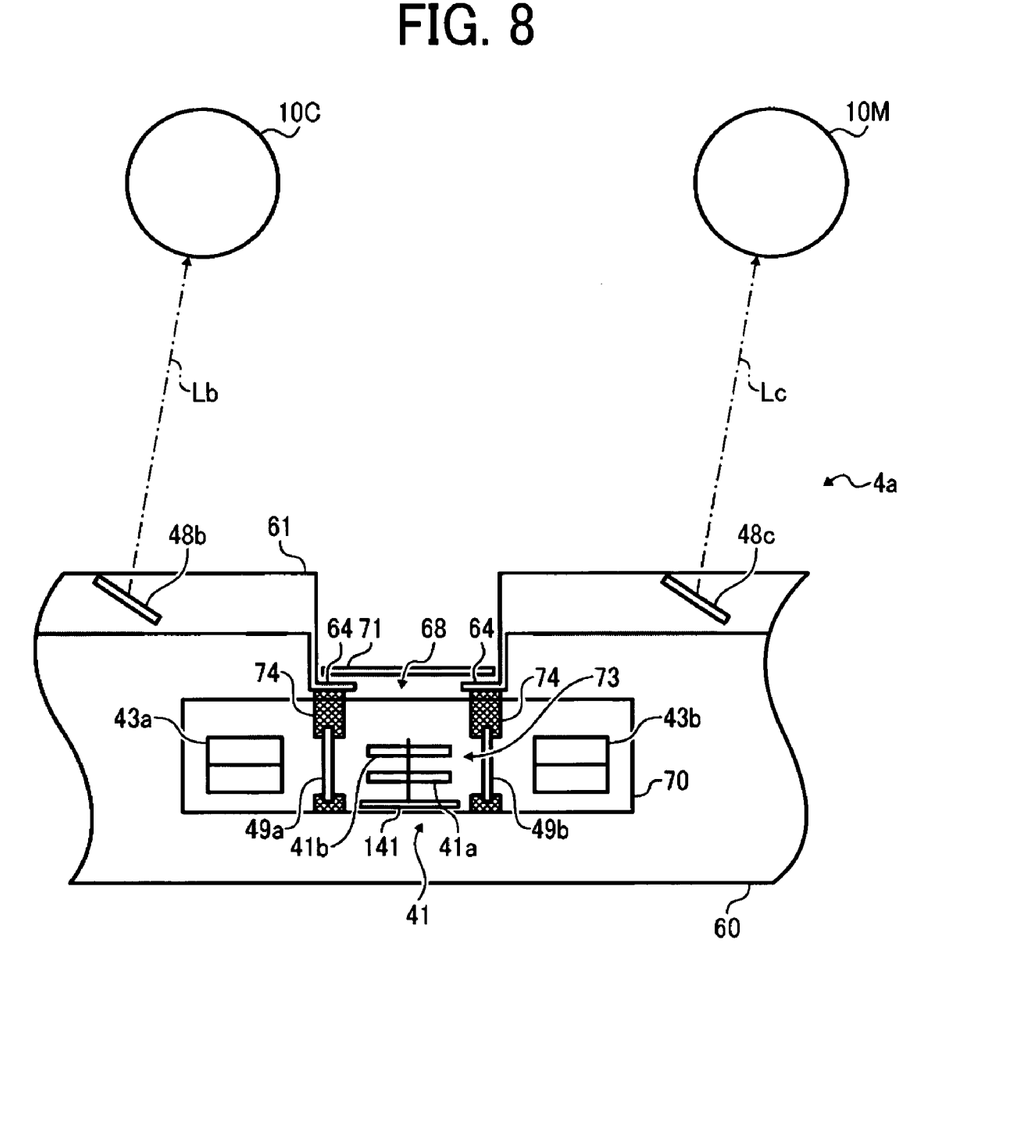
FIGS. 8, 9, and 10 illustrate schematic configuration of a main part of another optical scanning units according to another exemplary embodiments.

A description is now given to another configuration for an optical scanning unit with reference to FIG. 8. FIG. 8 illustrates a schematic configuration of an optical scanning unit 4a according to another exemplary embodiment.

As illustrated in FIG. 8, in the optical scanning unit 4a, the overlapping area 64 of the second cover 61 is disposed to a given position proximity of the polygon scanner compartment 73 of the first casing 70. By placing the overlapping area 64 at such position, only the polygon scanner 140 is exposed to outside through the opening portion 68 of the second cover 61 when the first cover 71 is removed from the optical scanning unit 4a. Accordingly, a dust-proofness (or dust resistance) of the optical scanning unit 4a when replacing the polygon scanner 140 can be enhanced.

Further, in another exemplary embodiment, because a top surface of the side wall 74 and the overlapping area 64 directly face each other, the side wall 74 can be used to suppress an intrusion of dust or foreign particles to an area encased by the second cover 61 and the second casing 60 even if dust or foreign particles may intrude in the polygon scanner compartment 73 when replacing the polygon scanner 140. Accordingly, adhesion of dust or foreign particles to optical elements such as mirrors or the like in the second casing 60 can be suppressed when replacing the polygon scanner 140.

Further, it is preferable that the overlapping area 64 is not extended to a position directly facing the polygon scanner 140 attached to the polygon scanner compartment 73. If the overlapping area 64 is extended to a position closely facing the polygon scanner 140, the overlapping area 64 may hinder a replacement work of the polygon scanner 140, by which replacement work may not be conducted efficiently.

Further, when the first cover 71 is fixed to the second casing 60 with screws, the overlapping area 64 can closely contact the top surface of the side wall 74, by which a sealing performance of the polygon scanner compartment 73 can be enhanced.

When the polygon mirrors 41a and 41b rotate, mirror surfaces of the polygon mirror 41a and 41b may mist over with nitrogen compound in the air because such nitrogen compound may adhere mirror surfaces. If the polygon scanner compartment 73 is not hermetically-sealed and thereby an air change may occur in the polygon scanner compartment 73, nitrogen compound may be supplied in the polygon scanner compartment 73 with such air change, by which the polygon mirrors 41a and 41b may mist over in a short period of time.

In another exemplary embodiment of FIG. 8, the overlapping area 64 closely contacts the top surface of the side wall 74 to enhance a sealing performance of the polygon scanner compartment 73, by which an intrusion of air having nitrogen compound can be suppressed. Accordingly, misting of the polygon mirrors 41a and 41b can be suppressed, and thereby a maintenance operation times for the polygon scanner 140 can be reduced.

In such another exemplary embodiment, the overlapping area 64 can closely contacts the top surface of the side wall 74 when the first cover 71 is fixed to the second casing 60 with screws. In other words, the overlapping area 64 does not closely contacts the top surface of the side wall 74 when the first cover 71 is not fixed to the second casing 60, and thereby the overlapping area 64 can closely contact the top surface of the side wall 74 when the first cover 71 is fixed to the second casing 60. Therefore, although the second cover 61 can cover the second casing 60 when first cover 71 is removed when replacing the polygon scanner 140, the second casing 60 may not be effectively sealed at the overlapping area 64, and thereby an intrusion of dust to the second casing 60 may occur.

On one hand, the overlapping area 64 can be closely contacted to the side wall 74 when the second cover 61 is fixed to the second casing 60 while the first cover 71 is not fixed to the second cover 61. In other words, the overlapping area 64 can be closely contacted to the top surface of the side wall 74 even when the first cover 71 is not fixed to the second casing 60, and thereby the overlapping area 64 can closely contact the top surface of the side wall 74 when the second cover 61 covers the second casing 60. With such configuration, only the polygon scanner compartment 73 is exposed to outside when the first cover 71 is removed from the second cover 61. Therefore, an intrusion of dust or foreign particles in an area encased by the second cover 61 from a space between the overlapping area 64 and the side wall 74 can be effectively suppressed when replacing the polygon scanner 140 compared to the above described configuration that the overlapping area 64 is not completely contacted to the side wall 74 when the first cover 71 is removed from the second cover 61. Further, the top surface of the side wall 74 can be configured to directly face any portion of the second cover 61 other than the overlapping area 64.

Figure 9:
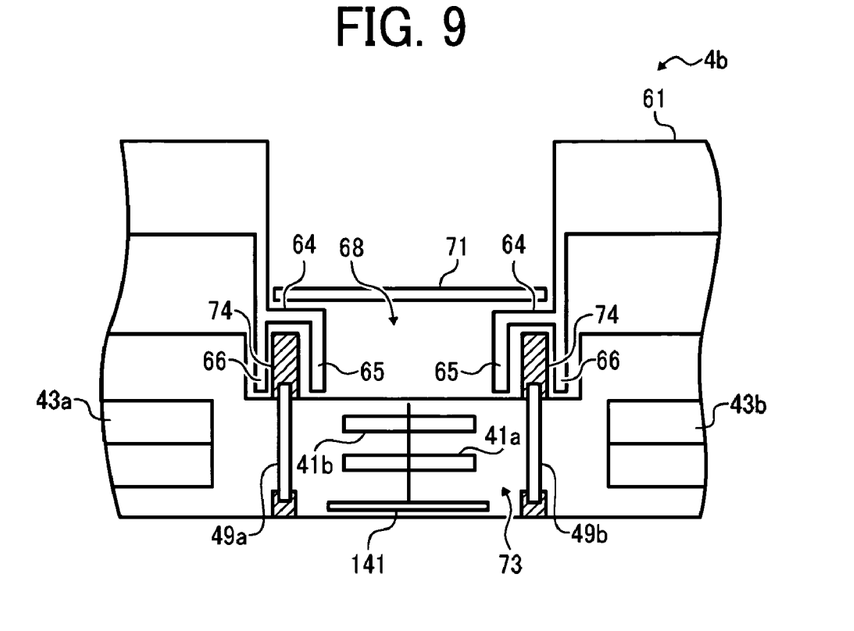

A description is now given to another configuration for an optical scanning unit with reference to FIG. 9. FIG. 9 illustrates a schematic configuration of an optical scanning unit 4b according to another exemplary embodiment.

Different from the optical scanning unit 4a in FIG. 8, the optical scanning unit 4b has lateral walls 65 and 66 for the second cover 61 as illustrated in FIG. 9, in which the lateral walls 65 and 66 directly face side faces of the side wall 74. With such configuration, dust or foreign particles intruded in the polygon scanner compartment 73 when replacing the polygon scanner 140 need to pass through a space between the lateral wall 65 and the side wall 74, a space between the top surface of the side wall 74 and the overlapping area 64, and a space between the lateral wall 66 and the side wall 74 to intrude in an area encased by the second cover 61 and the second casing 60.

Accordingly, by providing the lateral walls 65 and 66, foreign particles intruded in the polygon scanner compartment 73 may need to pass through a relatively longer path to intrude in an area encased by the second cover 61 the second casing 60, by which an intrusion of foreign particles can be suppressed (referred as labyrinth effect), by which adhesion of foreign particles to optical elements such as mirrors or the like in the second casing 60 can be further suppressed.

Figure 10:
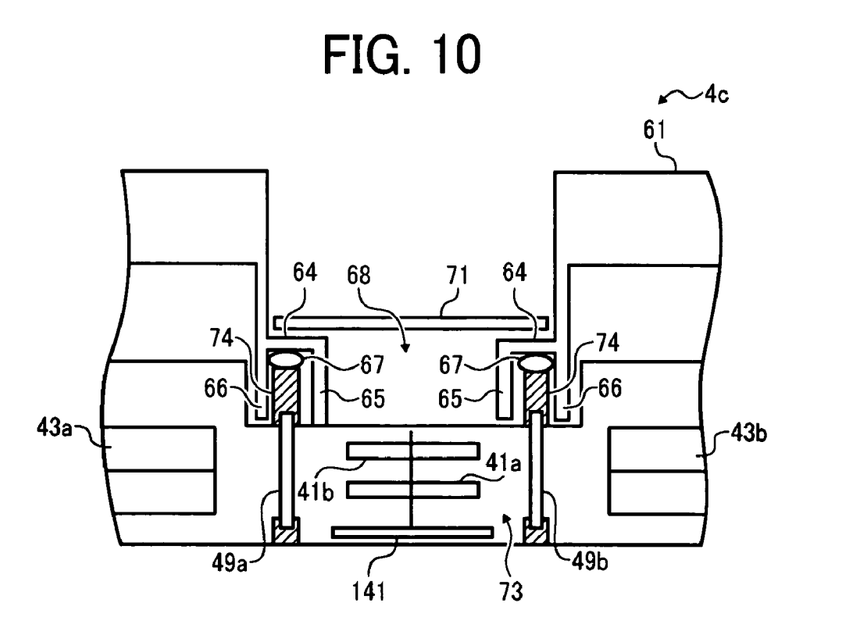

A description is now given to another configuration for an optical scanning unit with reference to FIG. 10. FIG. 10 illustrates a schematic configuration of an optical scanning unit 4c according to another exemplary embodiment.

Different from the optical scanning unit 4b in FIG. 9, the optical scanning unit 4c has a seal member 67, made of foamed resin, over the top surface of the side wall 74 as illustrated in FIG. 10. The seal member 67 may be fixed on the side wall 74 with adhesives or the like.

When the second cover 61 is attached and fixed to the second casing 60, the overlapping area 64 closely contacts the seal member 67 provided on the top surface of the side wall 74, and compresses the seal member 67. With such configuration, the top surface of the side wall 74 and the overlapping area 64 can be hermetically-sealed, by which foreign particles intruded in the polygon scanner compartment 73 when replacing the polygon scanner 140 may not intrude in an area encased by the second cover 61 and the second casing 60. Accordingly, adhesion of foreign particles to optical elements such as mirrors or the like in the second casing 60 can be further suppressed.

Further, with such configuration, a sealing performance of the polygon scanner compartment 73 can be enhanced. Accordingly, misting of the polygon mirrors 41a and 41b can be suppressed, and thereby a maintenance operation times for the polygon scanner 140 can be reduced.

Further, instead of foamed resin, other material can be used for the seal member 67. For example, an elastic member such as rubber, which can hermetically-seal the side wall 74 and the overlapping area 64, can be used. Further, the seal member 67 may be provided to the overlapping area 64, which directly faces the top surface of the side wall 74.

Further, a seal member can be provided in a space between the first cover 71 and the overlapping area 64 of the second cover 61. With such configuration, an intrusion of dust or foreign particles into the polygon scanner compartment 73 from the space between the first cover 71 and the second cover 61 can be suppressed, by which a sealing performance of the polygon scanner compartment 73 can be further enhanced.

In the above described exemplary embodiments, an optical scanning unit includes the first casing 70 housing the f-theta lenses 43a and 43b used as scan lens, the laser diodes 51a and 51b used as light source, the polygon scanner 140 used as deflector, and the second casing 60 attached with the first casing 70.

A positional relationship of the f-theta lenses 43a and 43b, the laser diodes 51a and 51b, and the polygon scanner 140 is generally common among optical scanning units using the polygon scanner 140 for deflecting a light beam. Therefore, the first casing 70 having the polygon scanner 140 can be commonly used among a number of optical scanning units. If the first casing 70 can be commonly used for a number of optical scanning units, parts management for the f-theta lenses 43a and 43b, the laser diodes 51a and 51b, and the polygon scanner 140 can be conducted among a number of optical scanning units with an common management system, by which such commonly usable parts can be manufactured with reduced cost. Further, testing of positional precision of the f-theta lenses 43a and 43b, the laser diodes 51a and 51b, and the polygon scanner 140 can be commonly used for a number of optical scanning units, by which optical scanning units can be manufactured with reduced cost.

Further, a maintenance operation of the polygon scanner 140 can be conducted only by removing the first cover 71. Accordingly, during a maintenance operation for the polygon scanner 140, optical elements housed in the second casing 60 such as mirrors disposed along an optical path starting from the f-theta lenses 43a and 43b to the photoconductor 10 are not exposed to outside, by which adhesion of dust or foreign particles to optical elements such as mirrors or the like in the second casing 60 can be suppressed.

Further, because the first cover 71 is made of a metal having higher heat conductivity, heat generated at the polygon scanner 140 can be conducted with a faster rate via the first cover 71, and then dissipated to outside of the optical scanning unit 4 via the first cover 71. Accordingly, an increase in temperature in the optical scanning unit 4 can be suppressed, and thermal deformation of optical elements such as f-theta lens can be suppressed.

Further, the second cover 61 is provided with the overlapping area 64, at which the second cover 61 overlaps with the first cover 71. Because the first cover 71 closely contacts the overlapping area 64, and is fixed to the first casing 70, an intrusion of dust or foreign particles from a space between the first cover 71 and the second cover 61 can be suppressed.

Further, as shown in a configuration of FIG. 8, the second cover 61 can be extended to the polygon scanner compartment 73, which houses the polygon scanner 140, by which only the polygon scanner 140 is exposed to outside when the first cover 71 is removed from the optical scanning unit 4.

Accordingly, a dust-proofness (or dust resistance) of the optical scanning unit 4 when replacing the polygon scanner 140 can be enhanced.

Further, as shown in a configuration of FIG. 8, the second cover 61 directly faces the top surface of the side wall 74 formed around the polygon scanner compartment 73. With such configuration, an area encased by the second cover 61 and the second casing 60 can be blocked by the side wall 74 when replacing the polygon scanner 140. Accordingly, an intrusion of dust or foreign particles into the area encased by the second cover 61 and the second casing 60 can be suppressed even when dust or foreign particles intrude in the polygon scanner compartment 73. Therefore, adhesion of foreign particles to optical elements such as mirrors or the like in the second casing 60 can be further suppressed when replacing the polygon scanner 140.

Further, by closely contacting the second cover 61 to the top surface of the side wall 74, an intrusion of dust or foreign particles into an area encased by the second cover 61 and the second casing 60 can be further suppressed even when dust or foreign particles intrude in the polygon scanner compartment 73. Further, by closely contacting the second cover 61 to the top surface of the side wall 74, a sealing performance of the polygon scanner compartment 73 can be enhanced, by which an intrusion of air having nitrogen compound into the polygon scanner compartment 73 can be suppressed. Accordingly, misting of the polygon mirrors 41*a* and 41*b* can be suppressed, and thereby a maintenance operation times for the polygon scanner 140 can be reduced.

Further, as shown in a configuration of FIG. 10, a seal member can be provided to the top surface of the side wall 74 to hermetically seal a space between the side wall 74 and the second cover 61, directly facing the top surface of the side wall 74. Therefore, an intrusion of foreign particles in an area encased by the second cover 61 and the second casing 60 from the space between the side wall 74 and the second cover 61 can be suppressed. Further, instead of the top surface of the side wall 74, the seal member can be provided to a portion of the second cover 61 facing the top surface of the side wall 74, wherein such portion may be opposite side of the overlapping area 64.

Further, with such configuration, an air intrusion to the polygon scanner compartment 73 from the space between the side wall 74 and the second cover 61 can be suppressed, by which a sealing performance of the polygon scanner compartment 73 can be enhanced.

Further, by providing the lateral walls 65 and 66 to the second cover 61 as shown in FIG. 9, which extend toward the first casing 70 and directly face the side face of the side wall 74, foreign particles intruded in the polygon scanner compartment 73 may need to pass through a relatively longer path to intrude in an area encased by the second cover 61 and the second casing 60, by which an intrusion of foreign particles can be suppressed (labyrinth effect), by which adhesion of foreign particles to optical elements such as mirrors or the like in the second casing 60 can be further suppressed.

Accordingly, an image forming apparatus employing an optical scanning unit according to exemplary embodiments can suppress image failure such as white streaks, and such image forming apparatus can be manufactured with reduced cost because an optical scanning unit can be manufactured with reduced cost as above described.

Although the above-described configurations using the casings and covers are employed for an optical scanning unit for use in an image forming apparatus, such configuration having the casings and covers can be employed for other applications, which may need a given level of dustproof or seal performance for elements housed in the casings while having a given level of easiness of replacing elements housed in the casings, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning unit for scanning a photoconductor, comprising:
   a light source for generating a light beam;
   a rotatable deflector configured to deflect the light beam generated by the light source to scan a surface of the photoconductor in a main scanning direction with the light beam,
   a driver configured to rotate the rotatable deflector;
   a scan lens configured to convert the light beam deflected by the rotatable deflector with equiangular motion speed to a light beam having constant speed motion to scan the photoconductor;
   an optical element, disposed along an optical path from the scan lens to the photoconductor surface, configured to guide the light beam passed through the scan lens;
   a first casing configured to house the light source, the rotatable deflector, and the scan lens;
   a second casing configured to house the first casing and the optical element disposed along an optical path from the scan lens to the photoconductor;
   a first cover configured to cover at least the first casing; and
   a second cover configured to cover the optical element housed in the second casing,
   wherein the second cover includes an overlapping area that overlaps the first cover, and the first casing and the second casing are covered by the first cover and the second cover when the first cover is fixed to the second cover at the overlapping area.

2. The optical scanning unit according to claim 1, wherein the first cover is made of a metal.

3. The optical scanning unit according to claim 1, wherein the first casing includes a rotatable deflector compartment for housing the rotatable deflector, and the second cover is extended to the rotatable deflector compartment.

4. The optical scanning unit according to claim 3, wherein the second cover has a portion directly facing a top surface of a side wall of the rotatable deflector compartment of the first casing, and the side wall is formed around the rotatable deflector.

5. The optical scanning unit according to claim 4, wherein the top surface of the side wall of the rotatable deflector compartment closely contacts the second cover.

6. The optical scanning unit according to claim 4, wherein one of the top surface of the side wall of the rotatable deflector compartment and a portion of the second cover directly facing the top surface of the side wall is provided with a seal member to hermetically seal a space between the top surface of the side wall and the second cover.

7. The optical scanning unit according to claim 4, wherein the second cover has a lateral side wall directly facing a side face of the side wall of the rotatable deflector compartment.

8. The optical scanning unit according to claim 1, wherein the second cover includes an opening portion, surrounded by the overlapping area, through which the rotatable deflector is removable from the first casing when the first cover is removed from the second cover.

9. An image forming apparatus, comprising:
an optical scanning unit, including:
a photoconductor;
a light source for generating a light beam;
a rotatable deflector configured to deflect the light beam generated by the light source to scan a surface of the photoconductor in a main scanning direction with the light beam,
a driver configured to rotate the rotatable deflector;
a scan lens configured to convert the light beam deflected by the rotatable deflector with equiangular motion speed to a light beam having constant speed motion to scan the photoconductor;
an optical element, disposed along an optical path from the scan lens to the photoconductor surface, configured to guide the light beam passed through the scan lens;
a first casing configured to house the light source, the rotatable deflector, and the scan lens;
a second casing configured to house the first casing and optical element disposed along an optical path from the scan lens to the photoconductor;
a first cover configured to cover at least the first casing; and
a second cover configured to cover the optical element housed in the second casing,
wherein the second cover includes an overlapping area that overlaps the first cover, and the first casing and the second casing are covered by the first cover and the second cover when the first cover is fixed to the second cover at the overlapping area.

10. The image forming apparatus according to claim 9, further comprising a plurality of image forming engines arranged in tandem for image forming.

11. An optical scanning unit for scanning a photoconductor, comprising:
a light source for generating a light beam;
a rotatable deflector configured to deflect the light beam generated by the light source to scan a surface of the photoconductor in a main scanning direction with the light beam,
a driver configured to rotate the rotatable deflector;
a scan lens configured to convert the light beam deflected by the rotatable deflector with equiangular motion speed to a light beam having constant speed motion to scan the photoconductor;
an optical element, disposed along an optical path from the scan lens to the photoconductor surface, configured to guide the light beam passed through the scan lens;
a first casing configured to house the light source, the rotatable deflector, and the scan lens;
a second casing configured to house the first casing and the optical element disposed along an optical path from the scan lens to the photoconductor;
a first cover configured to cover at least the first casing; and
a second cover configured to cover the optical element housed in the second casing,
wherein the first casing includes a rotatable deflector compartment for housing the rotatable deflector, and the second cover is extended to the rotatable deflector.

12. The optical scanning unit according to claim 11, wherein the second cover has a portion directly facing a top surface of a side wall of the rotatable deflector compartment of the first casing, and the side wall is formed around the rotatable deflector.

13. The optical scanning unit according to claim 12, wherein one of the top surface of the side wall of the rotatable deflector compartment and a portion of the second cover directly facing the top surface of the side wall is provided with a seal member to hermetically seal a space between the top surface of the side wall and the second cover.

14. The optical scanning unit according to claim 12, wherein the second cover has a lateral side wall directly facing a side face of the side wall of the rotatable deflector compartment.

15. An optical scanning unit for scanning a photoconductor, comprising:
a light source for generating a light beam;
a rotatable deflector configured to deflect the light beam generated by the light source to scan a surface of the photoconductor in a main scanning direction with the light beam,
a driver configured to rotate the rotatable deflector;
a scan lens configured to convert the light beam deflected by the rotatable deflector with equiangular motion speed to a light beam having constant speed motion to scan the photoconductor;
an optical element, disposed along an optical path from the scan lens to the photoconductor surface, configured to guide the light beam passed through the scan lens;
a first casing configured to house the light source, the rotatable deflector, and the scan lens;
a second casing configured to house the first casing and the optical element disposed along an optical path from the scan lens to the photoconductor;
a first cover configured to cover at least the first casing; and
a second cover configured to cover the optical element housed in the second casing,
wherein the second cover has a portion directly facing a top surface of a side wall of a rotatable deflector compartment of the first casing, and the side wall is formed around the rotatable deflector.

16. The optical scanning unit according to claim 15, wherein the second cover includes an overlapping area that overlaps the first cover, and the first casing and the second casing are covered by the first cover and the second cover when the first cover is fixed to the second cover at the overlapping area.

17. The optical scanning unit according to claim 16, wherein the second cover includes an opening portion, surrounded by the overlapping area, through which the rotatable deflector is removable from the first casing when the first cover is removed from the second cover.

18. The optical scanning unit according to claim 15, wherein the top surface of the side wall of the rotatable deflector compartment closely contacts the second cover.

19. The optical scanning unit according to claim 15, wherein one of the top surface of the side wall of the rotatable deflector compartment and a portion of the second cover directly facing the top surface of the side wall is provided with a seal member to hermetically seal a space between the top surface of the side wall and the second cover.

20. The optical scanning unit according to claim 15, wherein the second cover has a lateral side wall directly facing a side face of the side wall of the rotatable deflector compartment.

* * * * *